Oct. 29, 1940.    E. FISCHEL    2,219,985
GYROSCOPE
Filed Sept. 30, 1938    2 Sheets-Sheet 1

INVENTOR.
Edward Fischel
BY
Stephen Cerstvik
ATTORNEY.

Oct. 29, 1940.   E. FISCHEL   2,219,985
GYROSCOPE
Filed Sept. 30, 1938   2 Sheets-Sheet 2

INVENTOR.
Eduard Fischel
BY Stephen Cerstvik
ATTORNEY.

Patented Oct. 29, 1940

2,219,985

UNITED STATES PATENT OFFICE 2,219,985

GYROSCOPE

Eduard Fischel, Berlin-Charlottenburg, Germany, assignor to Siemens Apparate und Maschinen Gesellschaft mit beschrankter Haftung, Berlin, Germany, a German corporation Application September 30, 1938, Serial No. 232,693
In Germany March 31, 1937

5 Claims. (Cl. 33—204)

This invention relates to gyroscopes, and more particularly to gyroscopic devices for measuring changes in angular velocity.

One of the objects of the present invention is to provide novel means for measuring the angular acceleration of a vehicle such as an airplane about one of its axes.

Another object of the invention is to provide a novel apparatus of the above character for measuring a precession producing moment of a gyroscope, caused by the change of angular speed of a vehicle upon which the gyroscope is mounted.

A further object is to provide a novel device of the above character whereby lost motion, in mechanically transmitting banking acceleration values to a measuring device, is reduced to a minimum.

An additional object is to provide a novel device of the above character which is highly sensitive.

Another object is to provide a novel device of the above character wherein the means for measuring a precession producing moment of a gyroscope are rigidly connected to the precessing gyroscope.

A still further object is to provide a novel apparatus of the above character for measuring a precession producing moment of a gyro by means which are responsive to extremely small angular changes of an outer gimbal ring shaft of a gimbal ring in which the gyro is mounted.

The above and further objects and novel features will more fully appear from the following detailed description, when the same is read in connection with the accompanying drawings. It is to be expressly understood, however, that the drawings are for purposes of illustration only and are not intended as a definition of the limits of the invention, reference for this latter purpose being had to the appended claims.

Figure 1:
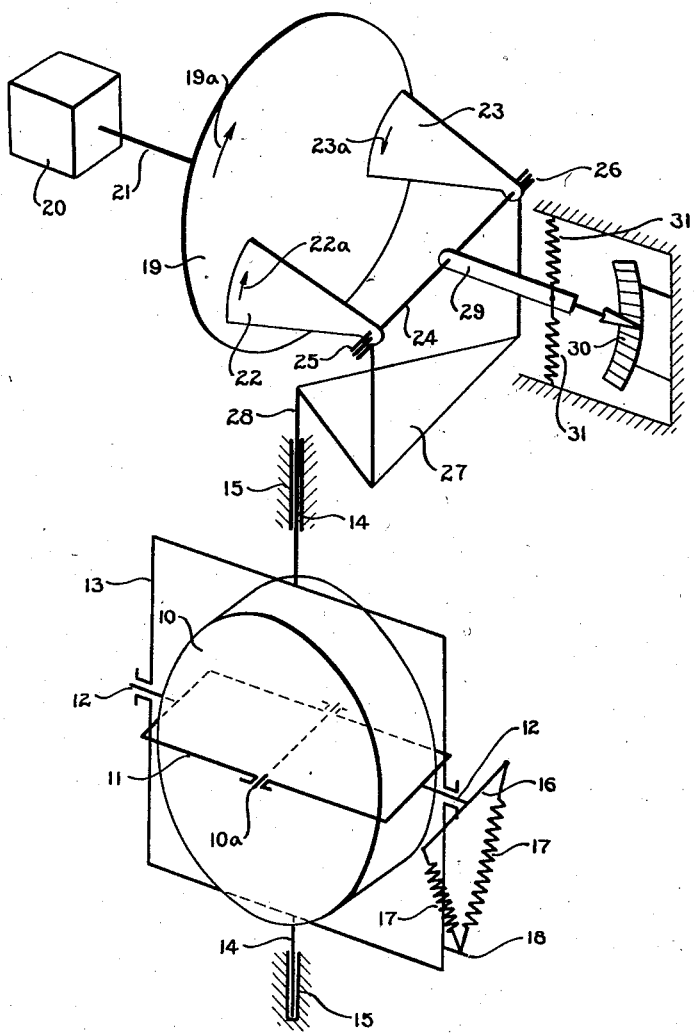
Figure 2:
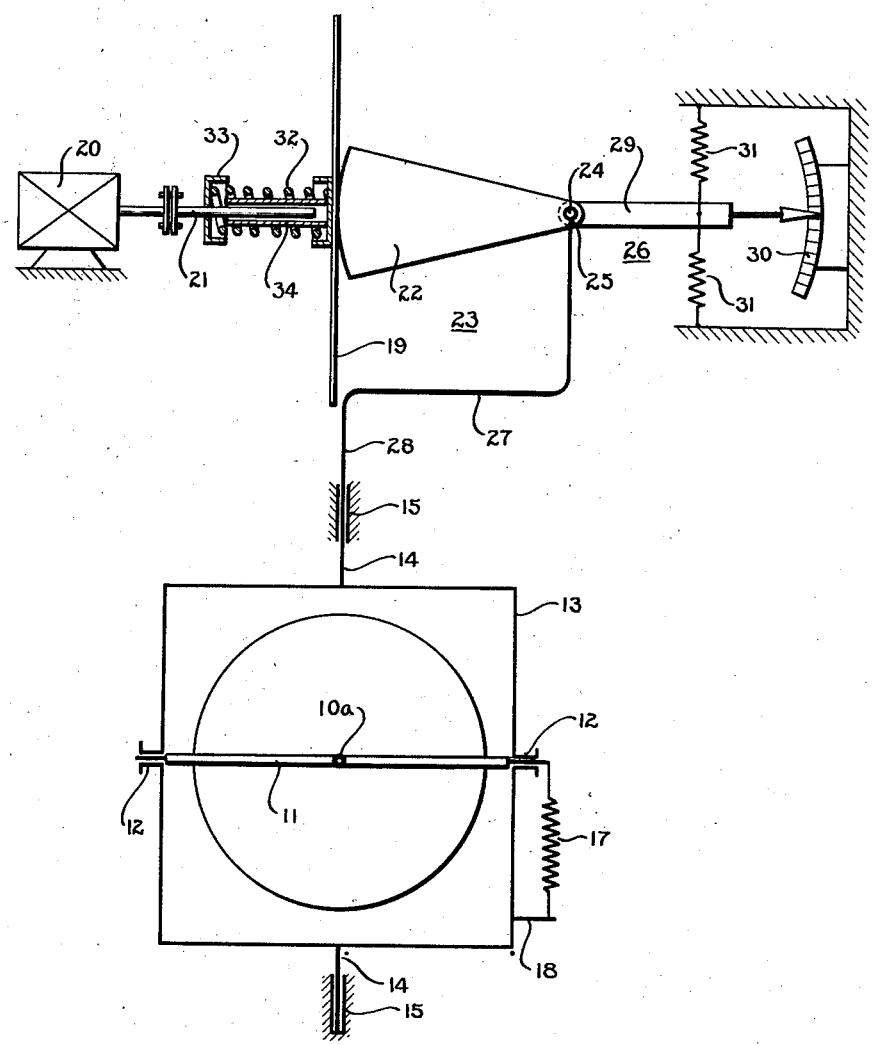

In the drawings, wherein like reference characters refer to like parts throughout the several views, Fig. 1 is a perspective schematic diagram of one embodiment of the invention; and, Fig. 2 is a side elevation of the parts shown in Fig. 1.

It is known that with the aid of a banking indicator gyro, the angular velocity of an aircraft about one of its axes can be determined by measuring the precession producing moment of the gyro which is brought about by the angular speed of the craft while turning.

If the angular or turning speed of the craft about the axis in question changes, there will be a corresponding change in a component of force which acts upon the gyro mounting in the direction of said axis. This change of component will produce a corresponding change in a precession producing moment which tends to cause a precession of the gyro about the above axis.

In devices heretofore proposed of this character, the angular acceleration has been determined by measuring the deformation of springs which were attached to the inner gimbal shaft of the gyro mounting, the spring deformation being responsive to the pressure in the bearings of said inner gimbal shaft. Instead of measuring pressures occurring at the bearings of the inner gimbal shaft, it is possible to shackle the outer gimbal shaft by means of springs and to determine the craft's angular acceleration by the moment transmitted via the bearings of the inner shaft to the outer shaft.

These arrangements have the disadvantage that part of the apparatus which is to provide the moment to be measured is subject to the action of springs which increase the period of oscillation and thus reduce the natural frequency of the apparatus, so that the applicability of the device, for example as a direction transmitter for control means which must operate at a high speed, is rather questionable.

The above disadvantage is overcome in the present invention in that the turning or precession producing moment comprising the acceleration value is transmitted by means of the outer gimbal shaft, with a minimum amount of lost motion and without a rotational movement of said shaft, to suitable measuring means comprising a mechanical device which is responsive to said precession producing moment and which is rigidly coupled to said outer gimbal shaft.

In the form shown in Fig. 1, a gyro having a rotor 10 is mounted by means of a shaft 10a in a conventional gimbal ring arrangement comprising an inner gimbal ring 11 having horizontal trunnions 12, the latter being mounted in an outer gimbal ring 13 having vertical trunnions 14 which rest in suitable bearings 15.

In order to retain the rotor in a proper position for measuring angular accelerations and in order to prevent the rotor from tumbling, a cross-piece 16 is rigidly secured to an extremity of one of the trunnions 12. To each extremity of cross-piece 16 there is secured a spring 17, the latter also being secured at a point 18 to the outer gimbal ring 13.

The gyro thus has a complete first degree of freedom, and a restricted second degree of freedom. The third degree of freedom is also restricted, but not by an analogous spring arrangement but by suitable means for measuring the angular acceleration of the craft. The measuring means, in the form shown, comprise a disc 19 which is operatively connected to a constant speed electric motor 20 by means of a shaft 21. In frictional engagement with disc 19 are two disc segments 22, 23 which are rigidly secured to a shaft 24 which is mounted in bearings 25, 26. The bearings are firmly secured to a plate 27, which has secured perpendicularly thereto a shaft 28 which is rigidly attached to one of the trunnions 14. The bearings 25, 26 are disposed at equal distances from plate 27, and the axis of shaft 28 is in the plane of disc 19 so that said axis passes through the center of the disc. Segments 22, 23 are arranged parallel to one another and at equal distances from the center point of disc 19 in such a manner that their center lines lie in a plane passing through a diameter of said disc. This plane passes through the disc 19 and the segments 22, 23 at right angles. The shaft 24, which is parallel to said disc, lies in said plane.

Means are provided for indicating movements of the shaft 24 comprising an arm 29 which is rigidly secured to said shaft and which serves as a pointer for a scale 30. Pointer 29 is resiliently held in a central position by means of opposed springs 31.

In order that a proper frictional engagement be maintained between disc 19 and segments 22, 23, the disc is resiliently urged against the segments by means of a spring 32 (Fig. 2) which rests upon a washer 33 attached to shaft 21. The spring surrounds a sleeve 34 to which the disc is attached, the sleeve being keyed to said shaft but adapted for longitudinal displacement relative thereto. The spring also serves as a compensating device for sudden temperature changes and is so dimensioned that it is able to receive the maximum moment to be transmitted without appreciably changing its form or shape.

In operation, when the craft upon which the apparatus is mounted moves in a curved path with a constant angular velocity about an axis which is parallel to that of trunnions 14, the gyro tends to remain stationary and resists a torque which is communicated to it by means of the segments 22, 23 which are in contact with disc 19 and which therefore tend to turn the gyro with the vehicle. This tendency of the gyro to remain stationary will cause an increase in pressure upon one of the segments 22, 23 which would cause an indication of acceleration upon scale 30 were it not for a counteracting precessional torque which occurs because of the restricting action of springs 17. When frame 13 is rotated about trunnions 14, the gyro will tend to precess, i. e., the gyro will tend to move about the trunnions 12. This tendency will be resisted by springs 17 which resistance will produce a counteracting precessional torque acting about trunnions 14 which, in turn, will equalize the pressure upon the segments 22, 23 so long as the angular velocity of the craft is constant. However, if the craft angularly accelerates, the counteracting precessional torque will fail to equalize said pressures and a pressure differential between the segments will occur in response to the angular acceleration. This change in counteracting torque therefore results in a moment acting to turn gimbal frame 13 about the axis of trunnions 14 around which the angular acceleration occurs. This moment is a function of the angular acceleration of the craft and is transmitted with a minimum amount of rotation of said trunnions to the measuring means by way of shaft 28 rigidly connected to one of the trunnions. Plate 27 therefore is moved a very slight amount sufficient to reduce the frictional pressure acting between one of the segments and the disc and to increase said pressure acting between the other segment and the disc. If the pressure, for example, acting upon segment 23 increases, and if disc 19 is rotating in the direction of arrow 19a, the segment will be moved in the direction of arrow 23a. The pressure of spring 31 will be overcome and the pointer 29 will be moved upwardly an amount which is a function of the frictional pressure differential between the two segments acting upon the disc and hence a function of the turning moment acting upon the gimbal mounting and therefore a function of the craft's angular acceleration.

There is thus provided a novel gyroscopic arrangement in which a symmetrical arrangement of the two segments 22, 23 relative to the disc 19 embodies the special advantage that the moment which is to be measured can act in a clockwise or counterclockwise direction about the axis of the trunnions 14 and can be directly transmitted to the shaft 28 connected thereto, and thence to the two segments 22, 23. The indicator 29 is thereby deflected from a central position in response to the direction of the moment.

Although only one embodiment of the present invention has been illustrated and described in detail, it is to be expressly understood that the same is not limited thereto.

In the form illustrated, shafts 14 and 28 are rigidly interconnected; however, any operative connection may be employed therebetween. Various changes may also be made in the design and arrangement of the parts without departing from the spirit and scope of the invention as the same will now be understood by those skilled in the art. For a definition of the limits of the invention, reference will be had primarily to the appended claims.

What is claimed is:

1. In a device of the character described, a gyro, means comprising inner and outer gimbal rings mounting said gyro for freedom of movement about three mutually perpendicular axes, means resiliently opposing movement of said inner gimbal ring and means opposing rotation of said outer gimbal ring, said last-named means comprising a rotating element, rotational means frictionally engaging said element on one side of the axis of rotation thereof, rotational means frictionally engaging said element on the other side of said axis, means interconnecting said engaging means for conjoint rotation, means connecting said two rotational means and said outer gimbal ring, and means for indicating the stress produced on said interconnecting means.

2. In a device of the character described, a gyro, means comprising inner and outer gimbal rings mounting said gyro for three degrees of freedom, means resiliently restraining movement of said inner gimbal ring and means for measuring the precessional effect of said gyro produced upon said outer gimbal ring, comprising a rotatable disc, means rotating said disc at constant speed, means contacting said disc at one side of the axis of rotation thereof, means contacting said disc at the opposite side of said axis, said disc contacting means being interconnected for angular movement as a unit, means rigidly connecting said outer gimbal ring for moving said contacting means during precession of said gyroscope, and indicating means connected to be actuated by angular movement of said contacting means.

3. In apparatus of the type employing a gyroscope, an inner gimbal frame being movable about a horizontal axis mounting said gyro, an outer gimbal frame adapted for movement about a vertical axis, means mounting said inner frame in said outer frame with their axis of rotation mutually perpendicular, and means for yieldingly urging said inner frame to maintain a chosen angular position with respect to said outer frame, the combination with said gyroscope of a rotatable element, means for rotating said element at constant speed, a contact pressure member for frictionally engaging said element at one side of the axis of rotation thereof, a second contact pressure member frictionally engaging said element on the opposite side of said axis of rotation, said members being pivotally mounted for movement in unison about a common axis, resilient means for urging said element into contact with said members, means for operatively connecting said outer frame to said members whereby a precession producing moment of said gyroscope forces one of said members towards said surface and the other member away from said surface, and means for indicating the torque of said members due to rotation of said element and the difference between the forces with which the respective members contact said element.

4. Means for measuring angular acceleration comprising a gyro, means comprising an inner and outer gimbal ring mounting said gyro for freedom of movement about three mutually perpendicular axes, means resiliently opposing pivotal movement of said inner gimbal ring relatively to said outer ring whereby said outer gimbal ring is urged to precess upon angular acceleration in a plane normal to its axis of precession, a constantly rotating element, a pivoted member frictionally engaging said element on one side of the axis of rotation thereof, a second pivoted member frictionally engaging said element on the other side of said axis, means resiliently urging said rotating element into engagement with said pivoted members, said pivoted members being connected for movement in unison about a common axis, means connected with said gyro and with said pivoted members and actuated upon precession of the gyro about said outer ring axis increasing the frictional engagement of one of said pivoted members with said rotatable element and decreasing the frictional engagement of the other of said pivoted members with said rotatable element, and means for measuring the difference in the amount of frictional engagement between said pivoted members and said rotatable element.

5. In a device of the character described, a disc, means constantly rotating said disc, a pivoted disc segment in contact with said disc at one side of the axis of rotation thereof, a second pivoted disc segment contacting said disc at the opposite side of said axis of rotation, means resiliently urging said first disc into contact with said segments, said disc segments being connected for movement in unison about a common axis, a gyro, means comprising inner and outer gimbal rings mounting said gyro for freedom of movement about three mutually perpendicular axes, means resiliently opposing movement of said inner gimbal ring, means connected between said outer gimbal ring and said disc segments and controlled by the precession of said gyro for differentially varying the contact pressure of said segments against said constantly rotating disc, and means for measuring the variation in torque produced by said differential variation.

EDUARD FISCHEL.